Patented Dec. 22, 1931

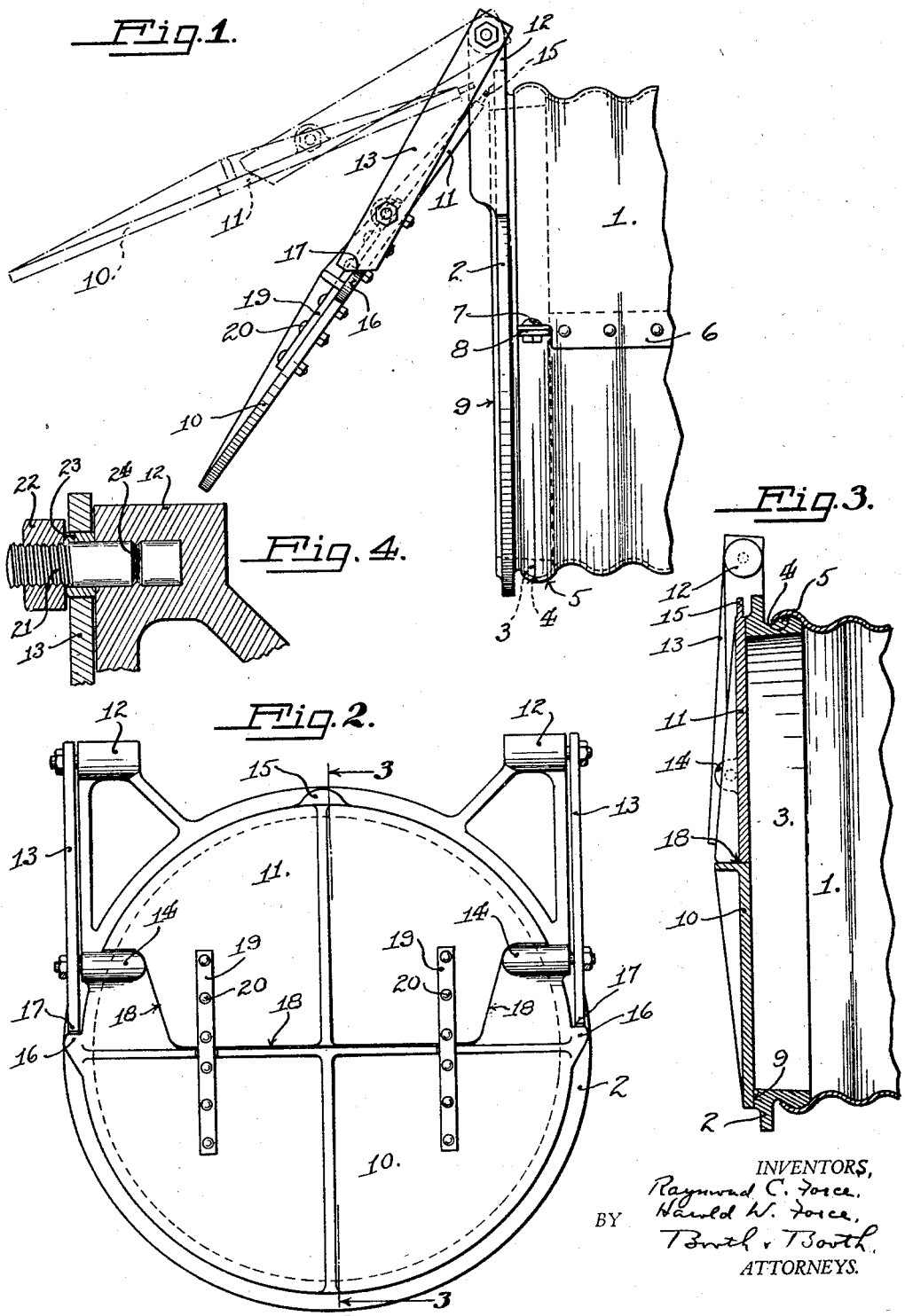

1,837,658

UNITED STATES PATENT OFFICE

RAYMOND C. FORCE, OF PIEDMONT, AND HAROLD W. FORCE, OF OAKLAND, CALIFORNIA, ASSIGNORS TO CALIFORNIA CORRUGATED CULVERT CO., OF BERKELEY, CALIFORNIA, A CORPORATION OF CALIFORNIA

FLOOD GATE

Application filed December 26, 1929. Serial No. 416,502.

The present invention relates to automatic flood gates or check gates of the type used for the directional control of the flow of water through a conduit, in irrigation, drainage or other similar work.

The objects of the invention are to provide a flood gate which will open easily and widely under a low head of water flowing in one direction and close tightly under a reverse flow; to provide means for preventing the gate from jamming or becoming stuck in open position; to provide inexpensive means for firmly attaching the gate to the end of the conduit; and to provide means for converting the gate from a simple check gate into a combined check and overflow gate. Other objects and advantages of the device will become apparent from the following description, which should be read with the understanding that the form, construction and arrangement of the several parts may be varied within the limits of the appended claims without departing from the spirit of the invention as expressed in said claims.

In the accompanying drawings:—

Fig. 1 is a side elevation of our gate attached to the end of a conduit, the gate itself being shown in open position.

Fig. 2 is a front elevation.

Fig. 3 is a central vertical section showing the gate in closed position.

Fig. 4 is a sectional detail of one of the link pivots.

In the drawings, the reference numeral 1 designates the end portion of a conduit, shown as of the well known corrugated form. 2 is the body or frame of the gate which is provided on its rear face with a flange 3, having a rounded outer surface 4 adapted to fit closely within the end corrugation 5 of the conduit 1. The conduit is shown with the usual longitudinal joint 6. In attaching the body 2 to the conduit, the flange 3 is inserted into the end corrugation 5 of said conduit before the joint is fastened. The end of the conduit is drawn up snugly about the flange 3 in any suitable manner, as for example by a clamp bolt 7 passing through outwardly projecting lugs 8, and the joint 6 is then fastened by rivets or any other desired means.

The flange 3 is thus securely held within the end corrugation 5 of the conduit in a simple and inexpensive manner.

The front of the gate body 2 is provided with a seating face 9 against which the gate seats. The gate itself is a circular disk formed in two parts 10 and 11 for a purpose to be explained hereinafter. The body 2 has a pair of upstanding spaced ears or brackets 12 upon which are pivoted depending links 13. The lower gate portion 10 has a pair of bosses 14 pivotally connected with said links. The gate is thus pivotally hung upon said links at a point somewhat above its center of gravity and is adapted to be held by its own weight against the seating face 9 of the body 2. When an outward flow of water occurs through the conduit, the gate 10—11 swings away from the face 9, allowing the water to discharge, but upon the cessation of such outward flow or upon a reversal of the flow, the gate automatically closes to prevent any inflow of water into the conduit. On account of the hanging of the gate by means of the links 13 it is easily and widely opened by an outflow of water even at very low head.

A lug 15 is provided upon the top of the gate to engage the upper edge of the body 2, as indicated in the full line position in Fig. 1, to prevent the gate from swinging to such a position that it would tend to jam in the opening of the body. Lugs 16 are also provided upon the sides of the gate to engage the lower ends 17 of the links 13 in order to prevent the gate from swinging too far with respect to said links. Therefore, if the gate opens wide, as indicated in broken line position in Fig. 1, under a large outflow of water, the lugs 16 will come into contact with the ends of the links 13, thus insuring that, upon closing of the gate, the top lug 15 will engage the upper edge of the body instead of entering the aperture therein as would be likely to occur if the side lugs 16 were not present. Thus the gate cannot jam under any conditions, and closes instantly and tightly upon cessation of the outward flow of water.

The gate itself is formed in two parts 10 and 11, as stated above. The joint between said parts may be in any position in the height of the gate, and is shown for example in Fig. 2 as about its middle, as indicated by the line 18. The lower portion 10 carries the bosses 14 by which the gate is hung on the links 13. The two portions of the gate may be held together in any desired manner, as for example by means of cleats 19 and bolts 20. If desired, the upper portion 11 may be removed entirely, leaving only the lower portion 10 to function as a combined check and overflow gate. In this condition any water flowing outwardly through the conduit 1 will be discharged, but water from outside cannot enter said conduit until the outside level rises to the top of the lower portion 10 of the gate, whereupon such water may overflow the gate and enter the conduit.

The pivotal connections between the ends of the links 13 and the frame brackets 12 are preferably made as shown in Fig. 4. A stud or bolt 21 is embedded in the bracket 12, and is threaded to receive a nut 22. A bushing 23 surrounds the bolt 21 between the nut and the bracket, and the link 13 swings upon said bushing. The bolt is provided with suitable retaining means, such as a circumferential groove 24, and is cast into the bracket. The bushing 23 not only provides increased bearing surface for the link, but permits the nut 22 to be set up tight, thus preventing it from working loose. The same construction is employed at the lower ends of the links, the bolts being embedded in the gate lugs 14.

We claim:—

1. A flood gate comprising a conduit having a circumferential channel formed in its end portion, a body having a seating face on one side, a flange extending from the opposite side of said body and adapted to be received within said channel, means for clamping said channel securely about said flange, a gate adapted for cooperation with said seating face, said gate having separable upper and lower portions, and a link pivotally connecting the lower portion of said gate with said body for free swinging movement toward and away from said seating face.

2. A flood gate comprising a body adapted for inclusion in a conduit and having a seating face, a gate adapted for cooperation with said seating face and provided with a lower portion and an upper portion, a link pivotally suspending said lower portion from said body, and means for removably connecting said upper portion with said lower portion.

3. A flood gate comprising a body adapted for inclusion in a conduit and having a seating face, a pair of spaced brackets rising from said body, depending links pivotally connected with said brackets, a gate adapted for cooperation with said seating face and divided into an upper portion and a lower portion, bosses formed upon said lower portion at the sides thereof, pivotal connections between said bosses and said links, and means for removably securing said upper portion to said lower portion.

In testimony whereof we have signed our names to this specification.

RAYMOND C. FORCE.
HAROLD W. FORCE.